(12) United States Patent
Fabian et al.

(10) Patent No.: US 8,984,911 B2
(45) Date of Patent: *Mar. 24, 2015

(54) ATOMIZING METHOD FOR PRODUCING SYNTHETIC QUARTZ GLASS

(71) Applicants: Heinz Fabian, Grossostheim (DE); Juergen Roeper, Sandersdorf-Brehna (DE)

(72) Inventors: Heinz Fabian, Grossostheim (DE); Juergen Roeper, Sandersdorf-Brehna (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/684,394

(22) Filed: Nov. 23, 2012

(65) Prior Publication Data

US 2013/0133376 A1 May 30, 2013

Related U.S. Application Data

(60) Provisional application No. 61/569,163, filed on Dec. 9, 2011.

(30) Foreign Application Priority Data

Nov. 25, 2011 (DE) .......................... 10 2011 119 339

(51) Int. Cl.
*C03B 37/018* (2006.01)
*C03B 20/00* (2006.01)
(Continued)

(52) U.S. Cl.
CPC ............... *C03B 20/00* (2013.01); *C03B 37/011* (2013.01); *C03B 37/01413* (2013.01); *C03B 19/1415* (2013.01); *C03B 2207/32* (2013.01); *C03B 2207/34* (2013.01); *C03B 2207/85* (2013.01)
USPC ................ 65/421; 65/413; 427/167; 118/726

(58) Field of Classification Search
None
See application file for complete search history.

(56) References Cited

U.S. PATENT DOCUMENTS

| 2,552,247 | A | 5/1951 | Wormuth et al. |
| 3,274,154 | A | 9/1966 | Kendrick et al. |

(Continued)

FOREIGN PATENT DOCUMENTS

| DE | 2435704 | 2/1976 |
| DE | 3500080 A1 | 7/1986 |

(Continued)

OTHER PUBLICATIONS

English Translation of JP 6-292868, translation date unknown.
(Continued)

*Primary Examiner* — Lisa Herring
(74) *Attorney, Agent, or Firm* — Tiajoloff and Kelly LLP

(57) ABSTRACT

The present invention relates to a method for producing synthetic quartz glass, comprising the steps of: providing a liquid $SiO_2$ feedstock material (105), which comprises more than 70% by wt. of the octamethylcyclotetrasiloxane D4, vaporizing the $SiO_2$ feedstock material (105) into a gaseous $SiO_2$ feedstock vapor (107), converting the $SiO_2$ feedstock vapor (107) into $SiO_2$ particles, depositing the $SiO_2$ particles on a deposition surface (160) while forming a $SiO_2$ soot body (200), vitrifying the $SiO_2$ soot body (200) while forming the synthetic quartz glass. According to the invention it is provided that vaporizing the heated $SiO_2$ feedstock material (105) comprises an injection phase in an expansion chamber (125) in which the heated $SiO_2$ feedstock material (105) is atomized into droplets, the droplets having a mean diameter of less than 5 pm, preferably less than 2 μm.

10 Claims, 3 Drawing Sheets

(51) Int. Cl.
  *C03B 37/01* (2006.01)
  *C03B 37/014* (2006.01)
  *C03B 19/14* (2006.01)

(56) References Cited

U.S. PATENT DOCUMENTS

| | | |
|---|---|---|
| 3,332,974 A | 7/1967 | Bostick |
| 3,493,533 A | 2/1970 | Bailey et al. |
| 3,629,309 A | 12/1971 | Bailey et al. |
| 3,903,047 A | 9/1975 | Ashby |
| 3,978,104 A | 8/1976 | Razzano |
| 3,998,865 A | 12/1976 | Siciliano et al. |
| 4,022,152 A | 5/1977 | Laufer et al. |
| 4,096,160 A | 6/1978 | Ashby |
| 4,158,092 A | 6/1979 | Botsch et al. |
| 4,220,460 A | 9/1980 | Partus |
| 4,556,726 A * | 12/1985 | Reedy et al. ............ 556/460 |
| 4,563,513 A | 1/1986 | Inomata |
| RE32,107 E | 4/1986 | January |
| 4,613,380 A | 9/1986 | Chen |
| 4,704,271 A | 11/1987 | Hourihan et al. |
| 4,720,353 A | 1/1988 | Bell |
| 4,824,985 A | 4/1989 | Goodwin et al. |
| 4,847,069 A | 7/1989 | Bissett et al. |
| 4,847,071 A | 7/1989 | Bissett et al. |
| 4,847,072 A | 7/1989 | Bissett et al. |
| 4,869,897 A | 9/1989 | Chatterjee et al. |
| 4,889,845 A | 12/1989 | Ritter et al. |
| 4,892,890 A | 1/1990 | Damani |
| 4,946,671 A | 8/1990 | Bissett et al. |
| 4,948,578 A | 8/1990 | Burger et al. |
| 4,954,332 A | 9/1990 | Bissett et al. |
| 4,954,335 A | 9/1990 | Janchipraponvej |
| 4,961,753 A | 10/1990 | Donkers et al. |
| 5,021,221 A | 6/1991 | Gould et al. |
| 5,039,513 A | 8/1991 | Chatterjee et al. |
| 5,043,002 A * | 8/1991 | Dobbins et al. ............ 65/386 |
| 5,049,617 A | 9/1991 | Yoshioka et al. |
| 5,143,661 A | 9/1992 | Lawter et al. |
| 5,152,819 A * | 10/1992 | Blackwell et al. ............ 65/386 |
| 5,154,744 A | 10/1992 | Blackwell et al. |
| 5,210,129 A | 5/1993 | de la Croi Habimana et al. |
| 5,211,732 A | 5/1993 | Abbot et al. |
| 5,232,689 A | 8/1993 | Katsoutlis et al. |
| 5,250,278 A | 10/1993 | Schuette et al. |
| 5,270,036 A | 12/1993 | Varaprath et al. |
| 5,275,761 A | 1/1994 | Bergmann |
| 5,279,818 A | 1/1994 | Halloran et al. |
| 5,292,530 A | 3/1994 | McCrea et al. |
| 5,300,285 A | 4/1994 | Halloran et al. |
| 5,302,382 A | 4/1994 | Kasprzak |
| 5,308,551 A | 5/1994 | Beauquey et al. |
| 5,326,557 A | 7/1994 | Glover et al. |
| 5,330,747 A | 7/1994 | Krzysik |
| 5,338,535 A | 8/1994 | Berndt |
| 5,356,451 A | 10/1994 | Cain et al. |
| 5,358,667 A | 10/1994 | Bergmann |
| 5,391,674 A | 2/1995 | Hara et al. |
| 5,399,649 A | 3/1995 | Okawa |
| 5,403,402 A | 4/1995 | LeGrow |
| 5,426,168 A | 6/1995 | Witucki |
| 5,443,607 A | 8/1995 | Englisch et al. |
| 5,473,037 A | 12/1995 | Itoh et al. |
| 5,508,369 A | 4/1996 | Yamazaki et al. |
| 5,562,945 A | 10/1996 | Hijino et al. |
| 5,632,797 A | 5/1997 | Williams |
| 5,703,191 A | 12/1997 | Henderson et al. |
| 5,735,921 A | 4/1998 | Araujo et al. |
| 5,735,928 A | 4/1998 | Sayce et al. |
| 5,879,649 A * | 3/1999 | Henderson et al. ............ 423/337 |
| 5,938,853 A * | 8/1999 | Williams ............ 118/726 |
| 6,982,232 B2 | 1/2006 | Borrelli et al. |
| 7,506,521 B2 | 3/2009 | Bookbinder et al. |
| 7,506,522 B2 | 3/2009 | Bleaking et al. |
| 7,534,733 B2 | 5/2009 | Bookbinder et al. |
| 7,589,039 B2 | 9/2009 | Allan et al. |
| 8,245,543 B2 | 8/2012 | Huenermann |
| 2001/0020448 A1 | 9/2001 | Vaartstra et al. |
| 2003/0116091 A1* | 6/2003 | Grant et al. ............ 118/726 |
| 2006/0107693 A1 | 5/2006 | Trommer et al. |
| 2010/0132406 A1 | 6/2010 | Huenermann |
| 2010/0276291 A1 | 11/2010 | Durrer et al. |
| 2012/0276291 A1 | 11/2012 | Bird et al. |

FOREIGN PATENT DOCUMENTS

| | | |
|---|---|---|
| DE | 4029071 A1 | 3/1992 |
| DE | 4204406 A1 | 8/1993 |
| DE | 195 01 733 C1 | 5/1996 |
| DE | 10302914 A1 | 8/2004 |
| DE | 102007024725 A1 | 11/2008 |
| EP | 463045 | 1/1992 |
| EP | 463045 A1 | 1/1992 |
| EP | 0622452 A1 | 4/1994 |
| EP | 0622452 A1 | 11/1994 |
| EP | 673888 A1 | 3/1995 |
| EP | 908418 A1 | 3/1999 |
| EP | 1329429 | 7/2003 |
| JP | H04505149 | 9/1992 |
| JP | 6-292868 | 10/1994 |
| WO | 9010596 A1 | 9/1990 |
| WO | 2004065314 A1 | 8/2004 |

OTHER PUBLICATIONS

Espacenet English language abstract of DE 102007024725 A1, published Nov. 27, 2008.
Espacenet English language abstract of DE 4204406 A1, published Aug. 26, 1993.
Espacenet English language abstract of DE 10302914 A1, published Aug. 12, 2004.
Espacenet English language abstract of DE 3500080 A1, published Jul. 10, 1986.
Dow Corning(R) 244 Fluid (German Language edition), version 3.10, updated Jul. 2, 2008.
"Information about Volatile Silicone Fluids", Dow Corning Corporation, 1982.
Dow Corning(R) 244 Fluid Material Safety Data Sheet, version 2.6, updated Jul. 13, 2007.

* cited by examiner

ATOMIZING METHOD FOR PRODUCING SYNTHETIC QUARTZ GLASS

RELATED APPLICATIONS

This application claims the benefit of U.S. provisional application Ser. No. 61/569,163 filed Dec. 9, 2011, which is herein incorporated in its entirety by reference.

FIELD OF THE INVENTION

The present invention relates to a method for producing synthetic quartz glass, comprising the steps of:
(A) providing a liquid $SiO_2$ feedstock material (105), which comprises more than 70% by wt. of the polyalkylsiloxane D4,
(B) vaporizing the liquid $SiO_2$ feedstock material (105) into a gaseous $SiO_2$ feedstock vapor (107),
(C) converting the feedstock vapor (107) into $SiO_2$ particles,
(D) depositing the $SiO_2$ particles on a deposition surface (160) so as to form a $SiO_2$ soot body (200),
(E) vitrifying the $SiO_2$ soot body while forming the synthetic quartz glass.

For the production of synthetic quartz glass for commercial applications, chlorine-free feedstock materials are tested. Monosilanes, alkoxysilanes and siloxanes should be mentioned as examples. A particularly interesting group of chlorine-free feedstock materials is formed by the polyalkylsiloxanes (also shortly "siloxanes"), which are e.g. known from EP 463 045 A1. The substance group of siloxanes can be subdivided into open-chain and closed-chain polyalkylsiloxanes. The polyalkylsiloxanes have the general sum formula $SiO_p(R)_{2P}$, where P is an integer $\geq 2$. The residue "R" is an alkyl group, in the simplest case a methyl group.

Polyalkylsiloxanes are distinguished by a particularly high content of silicon per weight fraction, which contributes to the economy of their use in the manufacture of synthetic quartz glass. At the moment octamethylcyclotetrasiloxane (OMCTS) is preferably used because of its large-scale availability in a high purity. This substance is also designated as "D4" according to a notation introduced by General Electric Inc., where "D" represents the group $[(CH_3)_2Si]$—O—.

The silicon-containing feedstock material can be supplied in liquid form to the consumer, such as e.g. a deposition burner. As a rule, however, the liquid feedstock material is converted by means of a vaporizer into a gaseous or vaporous phase and supplied to the consumer as a continuous gas stream. In the known vaporization systems the liquid to be vaporized is brought into contact with a hot surface. Hot surfaces may lead to unforeseen changes, such as e.g. decompositions and polymerizations, especially in the case of organic feedstock material, so that it is not easily discernible to which extent the composition of the vapor still corresponds to that of the liquid. This leads to a certain variability and non-reproducibility in the process control, which may result in defects in the particle formation process and in inhomogeneities in the soot structure.

It is the object of the present invention to provide a method used for producing $SiO_2$ soot bodies of high material homogeneity, in which the said drawbacks are avoided.

To achieve said object, the invention suggests a method comprising the features of patent claim 1. Each of the dependent claims lists preferred developments.

This object, starting from the aforementioned method, is achieved according to the invention in that vaporizing the heated $SiO_2$ feedstock material comprises an injection phase during which said feedstock material is injected into an expansion chamber in which the $SiO_2$ feedstock material is atomized into fine droplets, the droplets having a mean diameter of less than 5 μm, preferably less than 2 μm.

In contrast to the known methods in which a feedstock material is used that consists of a single defined silicon compound of the highest purity possible (e.g. $SiCl_4$), the present invention suggests a $SiO_2$ feedstock material that contains octamethylcyclotetrasiloxane (here also called D4) as the main component.

The special feature of the method according to the invention is that the vaporization of the $SiO_2$ feedstock material is distinguished by a particularly uniform heat input. It is known in the prior art that liquids are induced to flow over hot surfaces so as to achieve a heat input and vaporization. In the case of a $SiO_2$ feedstock material which is based on the polyalkylsiloxane D4, such a procedure leads, however, to gel formation that may clog the vaporizer and/or the hot surfaces. To overcome that drawback, it is provided according to the invention that the $SiO_2$ feedstock material is vaporized in an expansion chamber. The $SiO_2$ feedstock material flows here through a feed line into the expansion chamber. In contrast to known methods, the method according to the invention is distinguished in that an atomizing nozzle is used. This makes it possible to atomize the liquid $SiO_2$ feedstock material into liquid spheres having micrometer sizes. Such liquid spheres, also called droplets, have a large surface in comparison with the volume. Furthermore, the spherical shape ensures that there is a uniform heat input into the liquid. Thus the liquid droplets with the D4 molecules are evenly heated and a thermal separation of the polyalkylsiloxanes is prevented. The amount of the gels forming in the vaporization process is thereby considerably reduced, which results in a more homogeneous density distribution of the soot body—and thus of the quartz glass.

To achieve the advantages according to the invention, the atomizer head must ensure that the liquid $SiO_2$ feedstock material is atomized into fine droplets having a mean diameter of less than 5 micrometers (hereinafter also "μm"). It could be determined in a number of measurements that gel formation and inhomogeneities, respectively, were particularly strongly reduced in the soot material if the droplets had a mean diameter between 0.5 μm and 2 μm. Very preferred measurement series were between 0.5 μm and 20 nm ($d_{50}$ value). The median value or $d_{50}$ value is here the most important parameter as a measure of the mean particle size. The $d_{50}$ value describes the value in the case of which 50 percent of the droplets are finer and the other 50% are coarser than $d_{50}$. Moreover, the variation range of the mean droplet size should be as small as possible. Particularly preferred results could be achieved if the droplet sizes varied in the 2σ variance only by +1 μm and −0.35 μm. This small variation range had the effect that a very uniform mist of fine droplets was sprayed into the interior of the expansion chamber. These uniform liquid droplets of $SiO_2$ feedstock material can then be transferred by heat irradiation of the inner walls of the expansion chamber and/or heat transfer from a heated carrier gas into the gas phase. It is here also the objective of the method according to the invention that the droplets of the $SiO_2$ feedstock material are prevented from impinging on inner walls of the expansion chamber and from vaporizing only on said walls. Rather, the vaporizing process should exclusively take place in the free space of the expansion chamber. Although the inner wall of the expansion chamber may be heated and the heat radiation may contribute to a vaporization of the liquid droplets of the $SiO_2$ feedstock material, a situation must be avoided where a direct contact takes place between the heated inner walls of metal and the $SiO_2$ feedstock material, for, as has been explained, a contact of the $SiO_2$ feedstock material with the heated inner walls of the expansion chamber leads to gel formation, which shall be prevented according to the invention.

Within the scope of the invention the term polyalkylsiloxane comprises both linear and cyclic molecular structures. It is however preferred when the $SiO_2$ feedstock material comprises D4 as the main constituent. The notation D3, D4, D5 derives from a notation introduced by General Electric Inc., wherein "D" represents the group $[(CH_3)_2Si]$—O—. Thus D3 describes hexamethylcyclotrisiloxane, D4 octamethylcyclotetrasiloxane, D5 decamethylcyclopentasiloxane, and D6 dodecamethylcyclohexasiloxane. In a preferred variant, the main component of the $SiO_2$ feedstock material is D4. Thus the portion of D4 is at least 70% by wt, particularly at least 80% by wt., preferably at least 90% by wt., particularly preferably at least 94% by wt. of the $SiO_2$ feedstock material.

Within the scope of the invention the term "dew point" describes the temperature at which an equilibrium state of condensing and evaporating liquid is obtained.

Within the scope of the invention the terms "diluent" and "carrier gas" are used as synonyms.

Within the scope of the invention a liquid $SiO_2$ feedstock material is used that consists of more than 70% by wt. of the polyalkylsiloxane octamethylcyclotetrasiloxane D4 and its linear homolog. In addition, the liquid $SiO_2$ feedstock material may comprise additional components of other polyalkylcyclosiloxanes, such as D3, D5, D6, D7 and D8. Thus the additional constituents of the feedstock material that are summarized under the term "additional components" have molecular masses and boiling temperatures which differ upwards and/or downwards from the relative molecular mass of D4 (about 297 g/mol) and in the boiling temperature of D4 (about 175°). The liquid $SiO_2$ feedstock material which may comprise additional components is supplied to a reaction zone in gaseous form and is thereby decomposed by oxidation and/or hydrolysis and/or pyrolysis into $SiO_2$.

With the method according to the invention as is here disclosed, it is possible to vaporize also very great amounts of $SiO_2$ feedstock material in a uniform and fast manner. Thus the number of vaporizers needed for building up large-volume cylindrical soot bodies with an outer diameter of more than 300 mm can be reduced. According to the invention the vaporizers have vaporization rates of 15-25 kg per hour of the polyalkylsiloxane D4. It is only possible with the help of the method according to the invention to transfer such a great amount of $SiO_2$ feedstock material into the gas phase. The use of known vaporization techniques would presuppose that large and strongly heated metal surfaces are used for vaporization. However, upon contact of the $SiO_2$ feedstock material with the strongly heated metal surfaces, D4 would be polymerized and/or thermally separated. These drawbacks might then lead to clogging and/or a deterioration of the performance of the vaporizer and to inhomogeneities in the soot body and the quartz glass, respectively. It is only by vaporizing the $SiO_2$ feedstock material in its liquid form into small liquid droplets having a small diameter that large amounts of the $SiO_2$ feedstock material can be heated in a uniform way without the formation of gels or other waste products that might have a detrimental effect on the action of the vaporizer and/or on the homogeneity of the soot body.

To achieve a uniform conversion of the liquid droplets of the $SiO_2$ feedstock material into the $SiO_2$ feedstock vapor, a carrier gas is advantageously used that flows through the expansion chamber of the vaporizer. Advantageously, an amount between 8 and 20 $m^3$/h of an inert gas such as nitrogen or argon is here used. This carrier gas should have a maximum primary pressure between 2 and 8 bar so as to flow through the expansion chamber at an adequately fast rate on the one hand and not to impair the atomizing nozzle on the other hand. Advantageously, the carrier gas is preheated and has a temperature in the range between 130° C. and 180° C. it is thereby possible to generate a mixture of $SiO_2$ feedstock vapor and carrier gas that also has temperatures between 130° C. and 180° C. and is passed at a pressure between 1.1 and 2 bar out of the expansion chamber towards the vaporizer. The temperature within the vaporizer should not exceed 200° C. for the reason that the D4 might otherwise polymerize.

The range of the droplet size can be reduced in that a uniform cyclic disturbance is impressed on a liquid jet. This can be accomplished in that a mechanical vibration or an ultrasound source is applied to the atomizing nozzle. This disturbance causes a regular propagation wave along the jet that will finally break up the jet into almost uniform droplets. According to the invention the atomizer head should be configured such that only a small range of droplet sizes is generated.

Due to the manufacturing process soot bodies show a certain layer structure, the layers representing regions of local changes in the density or the chemical composition. It has been found that the use of a vaporizing process according to the invention yields a $SiO_2$ soot body with a surprisingly high homogeneity, particularly with a uniform and weak characteristic of the layer structure. This can be ascribed to the use of the method according to the invention which includes the formation of small droplets within a narrow range of droplet sizes.

A further advantageous configuration of the method according to the invention is distinguished in that the additional component D3 and/or the additional component D5 account for not more than 0.1% by wt. and 2% by wt. of a total weight of the liquid $SiO_2$ feedstock material; in particular, the sum of the weight fractions mD3+mD5 is in the range between 0.5% by wt. and 3% by wt. at the most, preferably between 0.2% by wt. and 2% by wt. at the most. Since dodecamethylcyclohexasiloxane (D6) and its linear homologs effect a noticeable change in the reaction zone and the particle formation process because of their large molecular mass as compared with D4 already in a small concentration, the weight fraction of D6 is preferably not more than 100 wtppm. Due to the small amounts of the additional components D3 and/or D5 the temperature and the range of the droplet sizes can be better optimized. This results in a particularly homogeneous $SiO_2$ soot body.

In the known vaporization systems the liquid to be vaporized is brought into contact with a hot surface. Hot surfaces may lead to unforeseen changes, such as e.g. decompositions or polymerizations, especially in the case of organic feedstock material, so that it is not easily discernible to which extent the composition of the vapor still corresponds to that of the liquid. This leads to a certain variability and non-reproducibility in the process control, which may result in defects in the particle formation process and in inhomogeneities in the soot structure.

To overcome these drawbacks, a further advantageous configuration of the vaporization process according to the invention is obtained in that vaporizing comprises the steps of:
heating the $SiO_2$ feedstock material,
introducing the heated $SiO_2$ feedstock material into an expansion chamber, so that at least a first part of the $SiO_2$ feedstock material and/or the droplets of the $SiO_2$ feedstock material vaporize due to a pressure drop.

Within the scope of this configuration the $SiO_2$ feedstock material is heated. Temperatures of the $SiO_2$ feedstock material between 150° C. and 200° C. are here desired. Higher temperatures may lead to polymerization. The use of a liquid/liquid heating system has turned out to be advantageous, wherein the $SiO_2$ feedstock material is heated by means of a further liquid, such as oil. A uniform and constant heating of the $SiO_2$ feedstock material takes place by way of a liquid/liquid heat exchanger without the formation of any singular hot regions, as is e.g. the case with electric heating wires. Such singular heating points rapidly lead to polymerization reactions that are to be prevented. After the $SiO_2$ feedstock material has been heated, said heated material is atomized into the expansion chamber. Inside the expansion chamber the $SiO_2$ feedstock material and/or the droplets of the $SiO_2$ feedstock material are converted into the gas phase. It has turned out to be particularly gentle for the $SiO_2$ feedstock material if this vaporizing process takes place as a result of a pressure drop. To this end the $SiO_2$ feedstock material can e.g. be heated as a supercritical liquid. It is only by way of a corresponding pressure inside the heating-up device that a boiling of the $SiO_2$ feedstock material is prevented. During expansion within the expansion chamber the $SiO_2$ feedstock material and/or the droplets of the $SiO_2$ feedstock material relax such that they pass into the gas phase. Pressure drops between 1.8 and 5 bar have turned out to be advantageous.

The heated pressurized feedstock material is introduced through a supply channel into the expansion chamber and is then nebulized and/or atomized via a corresponding spray head. The said pressure drop can take place directly above the atomizing nozzle and thereby ensure a fast, but uniform transfer of the $SiO_2$ feedstock material into the $SiO_2$ feedstock vapor. It is intended within the scope of these method steps that the $SiO_2$ feedstock material is introduced into the atomizing nozzle under pressure. In the atomizing nozzle the liquid $SiO_2$ feedstock material is then atomized into the $SiO_2$ droplets. Subsequently, these droplets, which are still under pressure, pass into the expansion chamber. The pressure drop proper which ensures the real vaporization of the droplets is generated in said chamber. Advantageously, the expansion chamber itself is heated to a temperature in the range between 150° C. and 200° C. Although the expansion chamber is not meant to ensure vaporization, the heat which is made available and radiates from the walls of the expansion chamber also into the interior of the expansion chamber supports the vaporizing process as a result of the pressure drop.

The size range of the droplets depends on many parameters. Apart from the rheological properties of the liquid and the geometry of the atomizing nozzle, this is particularly the exit velocity of the liquid out of the atomizing nozzle, which is substantially defined by the pressure difference. Within the said pressure difference range the exiting liquid jet disintegrates into fine drops with a narrow drop size distribution on account of a turbulent flow.

A further advantageous configuration of the vaporization process according to the invention is achieved in that vaporizing comprises the steps of:

heating the $SiO_2$ feedstock material,
introducing the heated $SiO_2$ feedstock material into the expansion chamber,
mixing the $SiO_2$ feedstock material and/or the droplets of the $SiO_2$ feedstock material with a heated diluent, so that at least a second part of the $SiO_2$ feedstock material vaporizes due to a decrease in the dew point.

Within the scope of this configuration variant, a diluent is used for vaporizing the $SiO_2$ feedstock material and/or the droplets of the $SiO_2$ feedstock material. Advantageously, the diluent is an inert carrier gas which flows through the expansion chamber. It is for this reason that the term diluent gas and the term carrier gas are regarded as synonyms in the following.

Within the scope of this configuration variant, the $SiO_2$ feedstock material is also heated. As has already been explained, it has turned out to be advantageous when the heating process is carried out by means of a heat exchanger and leads to a heating of the $SiO_2$ feedstock material to a temperature within the range of 120° C. to 200° C. The $SiO_2$ feedstock material is introduced through a corresponding pipe into the expansion chamber and is there atomized via an atomizing nozzle. To achieve a transition of the $SiO_2$ feedstock material into the $SiO_2$ feedstock vapor that is as uniform as possible, a diluent such as nitrogen may be introduced into the expansion chamber in a direction opposite to the spraying direction of the droplets of the $SiO_2$ feedstock material. Alternatively, the diluent may be passed in the direction of the spraying direction of the droplets of the $SiO_2$ feedstock material into the expansion chamber and/or in the direction of the spraying direction of the $SiO_2$ feedstock material towards the ultrasonic atomizer. The second part of the liquid $SiO_2$ feedstock material or the droplets of the $SiO_2$ feedstock material will vaporize upon entry into the expansion chamber because the partial pressure of the liquid $SiO_2$ feedstock material in the chamber is reduced and the dew point thereof will thus also decrease. The special feature of this method is that due to the lowering of the partial pressure the temperature at which the liquid $SiO_2$ feedstock material passes into the gas phase will also be reduced. Depending on the amount of the added and heated carrier gas, the dew point of the $SiO_2$ feedstock material will decrease by up to 30° C. Hence, a very strong heating of the $SiO_2$ feedstock material is not needed in the feed. Apart from nitrogen, argon and helium have also turned out to be useful as carrier gases or diluents. These are gases that show an inert behavior with respect to polyalkylsiloxanes, so that oxidation, polymerization or decomposition reactions between the liquid and the carrier gas, particularly under pressure and at an elevated temperature, and thus a non-reproducible change in the composition of the feedstock material are avoided.

Like in the above-described configuration variant of the vaporizing process by way of pressure drop, vaporization by way of reducing the partial pressure also makes it possible that the vaporization of the liquid $SiO_2$ feedstock material does not take place through metallic surfaces. Such metallic surfaces often exhibit inhomogeneous temperature distributions so that polymerization effects may partly occur on the particularly hot regions. To avoid such regions, it is intended according to the invention that vaporization by way of the partial pressure and/or the pressure drop already takes place upon entry of the $SiO_2$ feedstock material or the droplets of the $SiO_2$ feedstock material into the expansion chamber without the liquid passing to the inner walls of the expansion chamber and vaporizing at said place.

A configuration variant of the method according to the invention is distinguished in that the $SiO_2$ feedstock material is converted due to the pressure drop and/or the reduction of the partial pressure at at least 99.995% by wt, particularly preferably at at least 99.9995% by wt., into the $SiO_2$ feedstock vapor. This embodiment covers three variants:

1) The transfer of the droplets of the liquid $SiO_2$ feedstock material into the gas phase only takes place by way of the pressure drop upon entry into the expansion chamber, or
2) the transfer of the droplets of the liquid $SiO_2$ feedstock material into the gas phase takes place due to the lowering of the dew point, or 3) the transfer of the droplets of the liquid $SiO_2$ feedstock material into the gas phase takes place due to the pressure drop and also due to the lowering of the dew point.

To achieve a complete conversion, it has turned out to be advantageous when the liquid $SiO_2$ feedstock material is atomized into ultrafine droplets. The mean diameter thereof should here be smaller than 5 μm, preferably less than 2 μm, particularly preferably less than 1 μm. Thus the liquid feedstock material is converted into a cloud of small droplets that can evenly vaporize due to the expansion as a result of the pressure drop. The mean diameter is obtained as the arithmetic mean, i.e. the quotient of the sum of all values observed and of the number of the values.

To support this division of the liquid into small droplets, it has turned out to be useful when ultrasonic atomizers are used which due to the action of ultrasound effect a uniform and fine atomization of the $SiO_2$ feedstock material. Within the scope of the invention ultrasound designates a sound with frequencies above the range perceived by humans. This comprises frequencies between 16 kHz and 1.6 GHz. In an ultrasonic atomizer a liquid can be atomized with or without pressure application and with or without heating. For instance, a piezoceramic wetted with the liquid can be induced to vibrate by means of high-frequency alternating voltage. As a consequence, ultrasonic waves form in the liquid, the maximum strength of said waves being reached at a specific liquid level and said waves effecting the formation of a so-called ultrasonic trunk. Small liquid droplets or aerosols detach from this ultrasonic trunk and can be used for the desired application. The advantage of ultrasonic atomizers lies in the uniform atomization of variable volume flows, the almost constant drop spectrum over the whole volume flow range and the drops' own small velocity, resulting in a good controllability of the jet. Thus, a narrow droplet size distribution can be accomplished in a reproducible manner through ultrasonic atomization, which has a positive effect on the uniformity of the vaporization result.

As a further alternative, this configuration variant of the method according to the invention specifies that the liquid feedstock material is vaporized both by using the pressure drop and by lowering the partial pressure. This variant has turned out to be particularly advantageous because large amounts of liquid material have to be vaporized for obtaining quartz glass cylinders with diameters of up to 300 mm. To convert the needed material amounts in a gentle and uniform manner from the liquid phase into the gas phase, it has turned out to be preferred when a $SiO_2$ feedstock material which is overheated at least for partial components is introduced into the expansion chamber and is there transferred by pressure drop and by use of a diluent into the gas phase. This combination of the vaporization process due to a pressure drop and a reduction of the dew point makes it possible that of the $SiO_2$ feedstock material introduced in liquid form into the vaporizer, only very small amounts (less than 20 ppm, preferably less than 10 ppm, particularly preferably less than 5 ppm) do not vaporize. In individual tests the amount of non-vaporized $SiO_2$ feedstock vapor could even be reduced to less than 2.5 ppm.

As has been explained, the liquid $SiO_2$ feedstock material can be transferred more easily and uniformly into the gas phase if the individual amounts to be vaporized are each small and have a large surface. According to the invention this objective is achieved in that the liquid of the $SiO_2$ feedstock material is atomized into fine droplets. The atomized droplets can then be transferred via pressure drop and/or blending with the heated diluent/carrier gas into the gas phase. It has turned out to be advantageous when the contact of the fine droplets with the hot carrier gas takes place in the expansion chamber that is kept at a temperature ranging from 150° C. to 200° C. At a temperature of less than 150° C. there is a certain risk that droplets do not vaporize completely, so that liquid is entrained into the reaction zone, which leads to inhomogeneities in the particle formation process and to defects in the soot body structure, such as bubbles. At a temperature above 200° C., otherwise energetically inhibited reactions with non-reproducible and undesired reaction products, particularly decompositions and polymerization reactions, are more likely.

A further configuration variant of the method according to the invention is distinguished in that the very small droplets which are generated in the atomizing nozzle and have sizes of a few micrometers are mixed with a carrier gas (diluent gas), which is first heated via a heat exchanger. This method can be configured such that the liquid $SiO_2$ feedstock material need not be preheated. In this variant the carrier gas and the liquid $SiO_2$ feedstock material are mixed prior to the atomization proper into droplets or during atomization in the atomizing nozzle.

A further configuration variant of the method according to the invention is distinguished in that upon introduction of the $SiO_2$ feedstock material into the expansion chamber and/or to the atomizing nozzle a composition of the $SiO_2$ feedstock material is measured by means of a concentration detector. The supplied $SiO_2$ feedstock material and/or the droplets of the $SiO_2$ feedstock material are here analyzed by means of the concentration detector, e.g. a gas chromatographer. A similar analyzing station with a concentration detector can also be arranged at the outlet of the expansion chamber and can determine the composition of the $SiO_2$ feedstock vapor. One or both detectors may be part of a quality management system and send the composition measurement to a computing system where the quality of the added materials and vapors is monitored.

The fine droplets provide a large surface that allows a rapid and efficient, i.e. energy-saving, and above al complete vaporization of the liquid feedstock material. Especially changes in the composition due to decomposition, polymerization or distillation should thereby be avoided to a substantial degree and a defined composition of the feedstock material supplied to the consumer as well as a reproducible particle formation process are ensured. That is why the use of a synthetic quartz glass is also claimed, the synthetic quartz glass being produced according to the method as is here disclosed and used for the production of optical fibers. The method as is here disclosed allows the manufacture of quartz glass of a very high quality. Owing to the low inhomogeneities of the soot body it is possible to produce high-quality quartz glasses that are preferably used for telecommunication fibers, optical fibers.

The methods that are here disclosed have the following advantages over conventional known methods: (1) homogenization of the $SiO_2$ feedstock vapor to thereby achieve a homogenization of the soot body: (2) simplification of the vaporization process because the invention aims at a complete conversion of the liquid feedstock material into the gaseous $SiO_2$ feedstock vapor; and (3) the ability to reduce the vaporization temperature considerably by adding a diluent gas during the vaporization process so as to convert all fractions of the feedstock material into the gas phase without temperature-induced chemical reactions.

Further advantages, features and details of the invention become apparent from the sub-claims and the following description, in which with reference to the drawings an embodiment of the invention is described in detail. The features mentioned in the claims and the description can here be essential for the invention, either when taken singly or in any desired combination.

The starting point of the method according to the invention is here the formation of a gas stream from a $SiO_2$ feedstock vapor 107 which contains D4 as the main component. The gas stream is supplied to a reaction zone in which the $SiO_2$ feedstock vapor is converted into $SiO_2$ under formation of amorphous $SiO_2$ particles by pyrolysis, oxidation or hydrolysis. The subsequent deposition of the amorphous $SiO_2$ particles on a deposition surface 160 leads to the formation of a porous $SiO_2$ soot body 200 which forms a synthetic quartz glass by vitrification. To permit the production of large-volume cylindrical soot bodies 200 with outer diameters of more than 300 mm of improved material homogeneity, the invention discloses that the vaporization of the heated $SiO_2$ feedstock material comprises an injection phase in an expansion chamber in which the $SiO_2$ feedstock material is atomized, particularly in liquid form, into fine droplets, the droplets having a mean diameter of less than 5 μm, preferably less than 2 μm.

Figure 1:
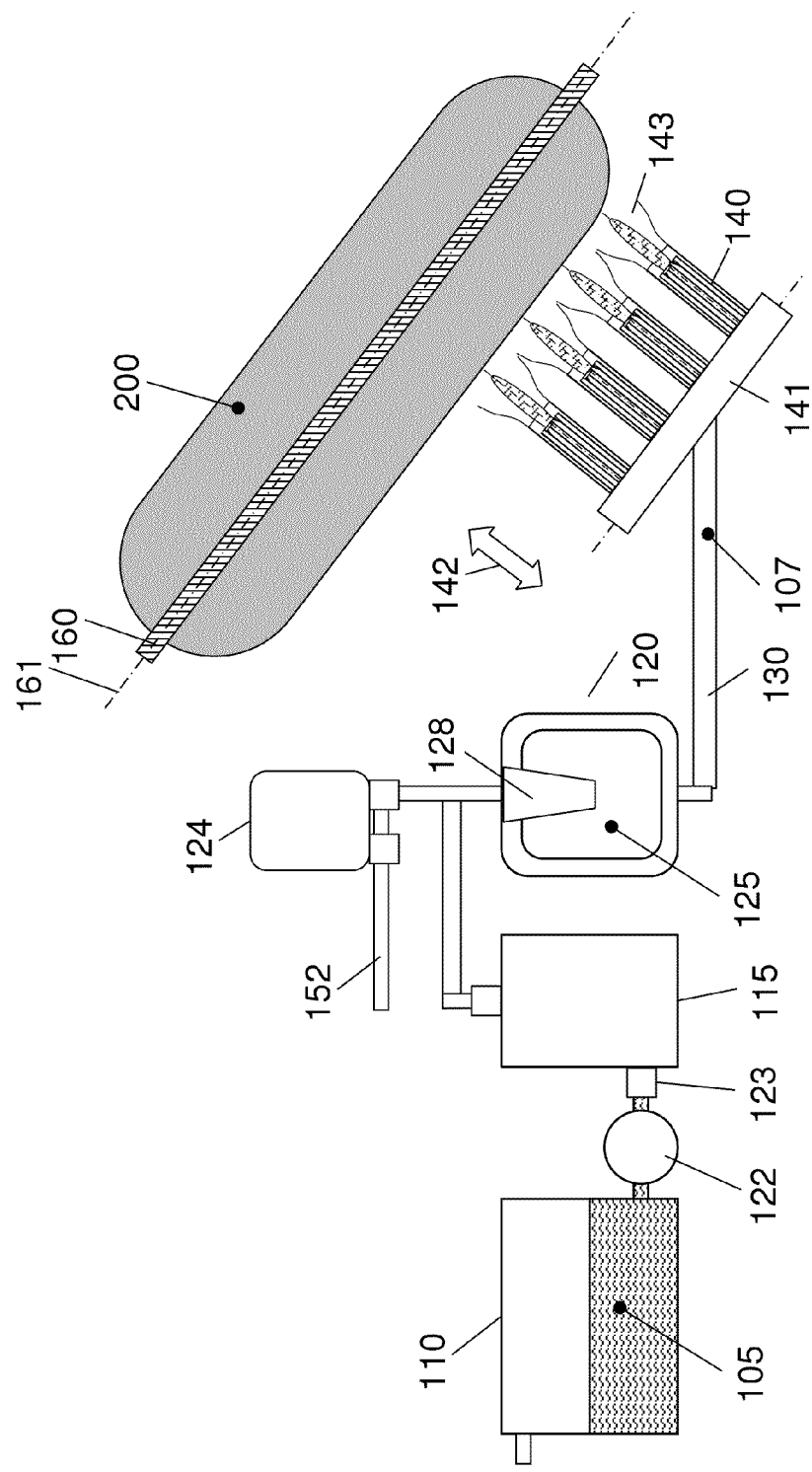
FIG. 1 shows a device for performing the method according to the invention for producing a $SiO_2$ soot body, in a schematic illustration.

The device shown in FIG. 1 serves to produce a $SiO_2$ soot body 200. A plurality of flame hydrolysis burners 140 which are arranged in a row are disposed along a carrier tube 160 of aluminum oxide. In a modification of the method which aims at a higher productivity, a plurality of deposition burners are used instead of only one burner 140 and these are reversingly reciprocated for soot deposition in a joint burner row along the rotating carrier tube, each of the burner flames only sweeping over a sub-length of the carrier tube 160.

The $SiO_2$ feedstock material 105 comprises preferably more than 95% by wt., preferably more than 98% by wt., particularly preferably more than 99.5% by wt. of the polyalkylsiloxane D4 and is supplied to the reaction zone in a gaseous form and is thereby decomposed by oxidation and/or hydrolysis and/or pyrolysis into $SiO_6$. The reaction zone is e.g. a burner flame or plasma. In the reaction zone $SiO_2$ particles 148 are formed, which are deposited layer by layer on the deposition surface 160 with formation of the $SiO_2$ soot body. The $SiO_2$ particles 148 themselves are present in the form of agglomerates or aggregates of $SiO_2$ primary particles with particle sizes in the nanometer range.

The flame hydrolysis burners 140 are mounted on a joint burner block 141 which is reciprocated in parallel with the longitudinal axis 161 of the carrier tube 160 between two turning points that are stationary with respect to the longitudinal axis 161, and which is displaceable in a direction perpendicular thereto, as outlined by the directional arrows 142. The burners 140 consist of quartz glass; their center-to-center distance is 15 cm.

A corresponding burner flame 143 which forms a reaction zone within the meaning of the invention is assigned to each of the flame hydrolysis burners 140. In the reaction zone $SiO_2$ particles are formed and deposited on the cylinder outer surface of the carrier tube 160 rotating about its longitudinal axis 161, so that a soot body 200 is built up layer by layer with an outer diameter of 350 mm. During the deposition process, a temperature of about 1200° C. is established on the soot body surface 200. The flame hydrolysis burners 140 are each fed with oxygen and hydrogen as combustion gases and, as feedstock material for the formation of the $SiO_2$ particles, with the $SiO_2$ feedstock vapor 107. Within the scope of the invention the term polyalkylsiloxanes comprises both polyalkylcyclosiloxanes and the linear homologs thereof.

The production of the $SiO_2$ feedstock vapor 107 of more than 95% by wt., preferably more than 98% by wt., particularly more than 99.5% by wt. of the polyalkylsiloxane D4 is carried out by means of a vaporizer system 120 that comprises a storage container 110 for the liquid mixture, a liquid pump 122, a flow meter 123 for liquid, an MFC (mass flow controller) 124 for the controlled supply of a carrier gas stream 152 of nitrogen, and a heatable vaporization chamber 125, also expansion chamber, with an atomizing nozzle 128. The storage container 110, a pump 122 and an atomizing nozzle 128 are interconnected by means of flexible metallic lines. The storage container 110 is heated to a temperature of 130° C. to 170° C., and the heated liquid is supplied by means of the pump 122 via the flow meter 123 in an exact dosage to the atomizing nozzle 128. In and by means of the atomizing nozzle the $SiO_2$ feedstock material 105 is atomized into fine droplets, also called $SiO_2$ droplets, wherein the $SiO_2$ droplets have a mean diameter of less than 5 μm, preferably less than 2 μm. A concentration detector for monitoring the composition of the $SiO_2$ feedstock material 105 and/or of the $SiO_2$ feedstock vapor 107 and/or of the $SiO_2$ droplets can here be provided in the connection line between flow meter 123 and atomizer 128.

The atomizer 128—also called atomizing nozzle—may here be an ultrasonic atomizer. Said atomizing nozzle 128 ensures that the liquid $SiO_2$ feedstock material is atomized into fine droplets, wherein the droplets have a mean diameter of less than 5 μm, preferably less than 2 μm. Depending on the design, a carrier gas stream of nitrogen can be supplied to the $SiO_2$ feedstock material 105 and/or the droplets via the MFC 123 at a pressure of 1.5 bar to 5 bar.

In an advantageous configuration the atomizing nozzle 128 atomizes the $SiO_2$ feedstock material into fine droplets with a maximum diameter of 1 μm and with a small droplet size distribution with a mean diameter ($d_{50}$ value) of 0.7 μm and, directly thereafter, sprays said droplets in an injection phase into the expansion chamber 125 of the vaporizer 120. The vaporizer 120 has an internal temperature of 195° C., so that the fine liquid droplets vaporize immediately and the vapor stream is supplied to a stationary flow distributor and distributed by said distributor via heat-insulated flexible media supply lines over the individual deposition burners 140.

A feed line for the combustion gases oxygen and hydrogen and one for an auxiliary gas (oxygen), which is used in the burner flame 143 between the stream of the feedstock material and the stream of the combustion gas and which counteracts premature mixing, also terminate in the flow distributor. Thus combustion gases and $SiO_2$ feedstock vapor 107 are only mixed in the hot zone of the burner flame 143. After completion of the deposition process a tube of porous $SiO_2$ soot (soot tube) is obtained.

Figure 2:
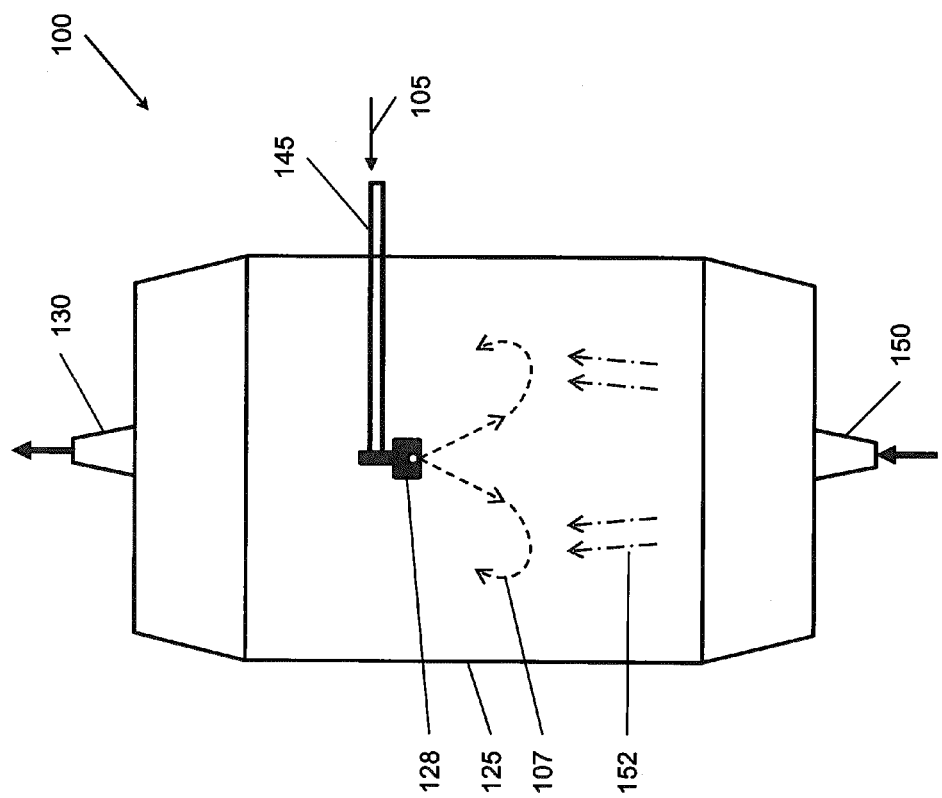
FIG. 2 is a schematic diagram showing the various elements of the quartz-glass production system according to the invention.
Figure 3:
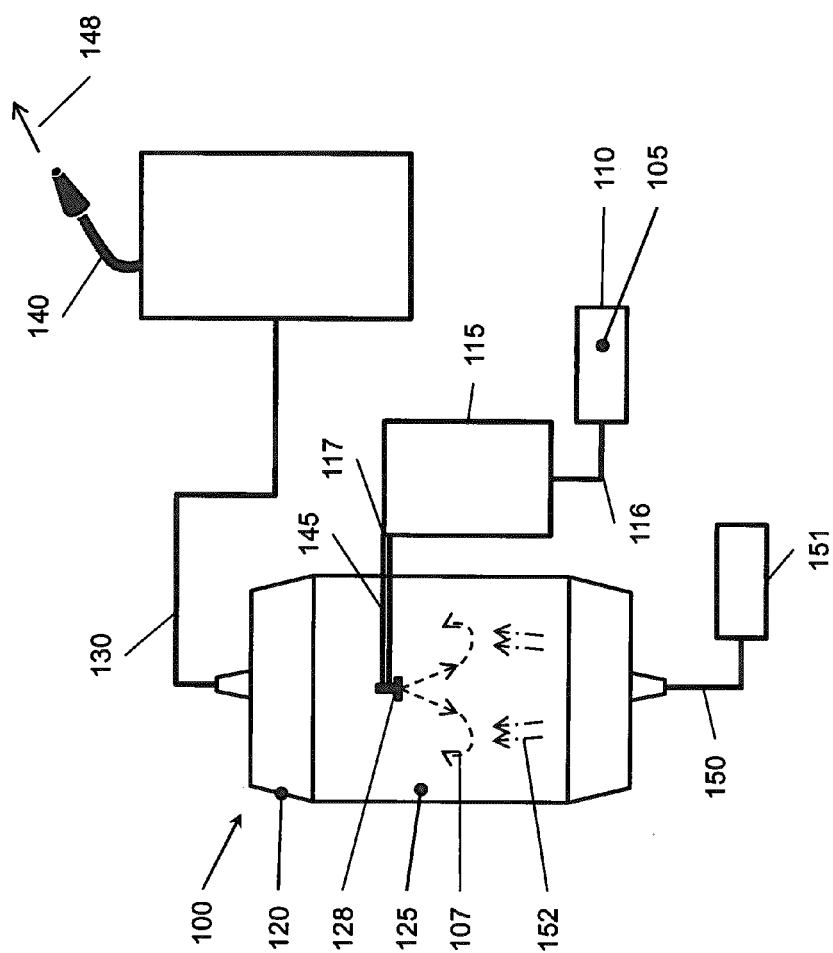
FIG. 3 is a schematic illustration of a vaporization chamber.

FIG. 2 and FIG. 3 show the system 100 for producing quartz glass which uses the method according to the invention. The $SiO_2$ feedstock material 105 is here heated and the atomizing process takes place by means of an atomizing nozzle 128 which comprises an ultrasound system. For this purpose the system 100 comprises a storage tank 110 from which the liquid $SiO_2$ feedstock material 105 is pumped by means of a pump (not shown) into a pre-heating device 115. With the help of known methods the liquid $SiO_2$ feedstock material 105 is heated up in the pre-heating device 115 to an elevated temperature. After having flown through the pre-heating device 115, the liquid $SiO_2$ feedstock material 105 is pumped into the atomizing nozzle. The liquid is then atomized therein and the droplets are injected into the expansion chamber. In the expansion chamber 125 the transition of the liquid SiO$_2$ droplets into the gaseous SiO$_2$ feedstock vapor 107 takes place. The SiO$_2$ feedstock vapor 107 flows via a line 130 to the burner 140 where a pyrolytic or hydrolytic conversion of the SiO$_2$ feedstock vapor into SiO$_2$ particles takes place.

The pre-heating device 115 has an inlet 116 and an outlet 117. The SiO$_2$ feedstock material 105 is fed through the inlet 116 into the pre-heating device 115. The SiO$_2$ feedstock material 105 is heated inside the pre-heating device 115. This can be done by using a hot oil system or an electric heating element in the walls of the pre-heating device. To heat up the liquid SiO$_2$ feedstock material 105 in a uniform manner while avoiding hot regions, it has turned out to be advantageous when the pre-heating device 115 comprises a flow channel which is surrounded by hot oil channels. The liquid-to-liquid heat transfer that can thereby be realized achieves a uniform heating of the liquid SiO$_2$ feedstock material 105. This type of uniform heating ensures that there is no temperature-induced chemical conversion of polyalkylsiloxanes. The heated liquid SiO$_2$ feedstock material 105 is discharged from the pre-heating device 115 into the expansion chamber 125 through a feed line 145.

The expansion chamber 125 defines an inner volume for the free expansion of the SiO$_2$ feedstock vapor. To achieve such a vaporization of the SiO$_2$ droplets into the gaseous feedstock vapor, it has turned out to be advantageous when the temperature of the liquid SiO$_2$ feedstock material is raised in the pre-heating device 115 above the boiling point of the SiO$_2$ feedstock material at the operating pressure of the expansion chamber. A preferred operating temperature for the pre-heating device 115 is about 180° C. The boiling point of D4 at atmospheric pressure is about 175° C. To avoid a situation where the liquid SiO$_2$ feedstock material boils, a back-pressure is needed in the pre-heating device. The liquid reactant is thereby kept as an undercooled (compressed) liquid in the pre-heating device 115.

As illustrated in FIG. 3, the liquid SiO$_2$ feedstock material flows from the pre-heating device 115 through the feed line 145 into the interior of the expansion chamber 125. The pre-heating device 115 heats the liquid SiO$_2$ feedstock material 105 to an adequate degree, so that it vaporizes almost completely while its pressure drops upon entry into the inner volume of the expansion chamber 125. Such an immediate vaporization will only take place if the pre-heating device 15 has raised the temperature of the liquid SiO$_2$ feedstock material above the boiling point of the SiO$_2$ feedstock material at the operating pressure of the expansion chamber 125. Thus the amount of the droplets of the SiO$_2$ feedstock material 105 which vaporizes immediately depends on the heating quantity supplied to the liquid SiO$_2$ feedstock material in the pre-heating device 115.

Alternatively, it is also possible to use the system 100 without heating the SiO$_2$ feedstock material. The SiO$_2$ feedstock material is here just atomized by means of the atomizing nozzle 128 without the SiO$_2$ feedstock material being heated to an elevated temperature. An additional heat input can here take place by way of a carrier gas which is e.g. also passed through the atomizing nozzle 128. Such a configuration variant differs in the basic structure from that shown in FIG. 3 only in that a preheating device 115 is not needed.

Especially nitrogen has turned out to be advantageous as diluent 152. Other diluents, e.g. argon or helium, can also be used if this is desired. These are gases that show an inert behavior with respect to polyalkylsiloxanes, so that oxidation, polymerization or decomposition reactions between the liquid and the carrier gas, especially under pressure and at elevated temperature, and thus a non-reproducible change in the composition of the feedstock material are avoided. The partial pressure of the liquid $SiO_2$ feedstock material, here the droplets of the $SiO_2$ feedstock material, in the expansion chamber 125 is reduced by supplying the diluent, and the dew point thereof is thereby lowered. As a result, the $SiO_2$ feedstock material need not be heated at high temperatures in the pre-heating device 115. Rather, temperatures between 130° C. and 170° C. are enough to ensure a complete conversion of the $SiO_2$ feedstock material into the $SiO_2$ feedstock vapor. It is here the aim that the vaporization of the $SiO_2$ feedstock material comprises an injection phase in which the feedstock material is atomized in liquid form into fine droplets, and a vaporization phase in which the fine droplets are rapidly and efficiently vaporized completely by contact with a hot carrier gas, but without contact with walls.

FIG. 3 illustrates the vaporization according to the invention. The heated-up $SiO_2$ feedstock material 105 is supplied through the feed line 145 to the expansion chamber 125. At the end of the feed line 145 in the interior of the expansion chamber 125, the feed line 145 comprises a nozzle-shaped atomizing nozzle 128. With the help of the atomizing nozzle 128, which is preferably an ultrasonic atomizer, the liquid $SiO_2$ feedstock material 105 is atomized into fine droplets having a mean diameter of less than 5 μm, preferably less than 2 μm, particularly less than one μm. Very preferred measurement series were between 0.5 μm and 20 nm ($d_{50}$ value). The median value or $d_{50}$ value is here the most important parameter as a measure of the mean particle size. The $d_{50}$ value describes the value at which 50 percent of the droplets are finer and the other 50% are coarser than $d_{50}$.

Due to the pressure drop occurring upon exit out of the atomizing nozzle 128, a substantial part of the droplets is transferred into the gas phase. In addition, a nitrogen stream preheated to about 130° C. to about 200° C. is passed through the media line 150 into the expansion chamber 125 and/or the atomizing nozzle 128. Advantageously, the nitrogen stream has a temperature that corresponds substantially, i.e. +/−10° C., to the temperature of the liquid $SiO_2$ feedstock material 105. The nitrogen stream can flow opposite to the spray direction of the liquid $SiO_2$ feedstock material 105 so as to ensure strong intermixing and adequate heat transfer.

It is not intended that parts of the liquid $SiO_2$ feedstock material 105—the droplets—deposit on the walls of the expansion chamber 125 and/or are thermally vaporized there. The outflow of the gaseous $SiO_2$ feedstock vapor 107 to the burner 140 takes place through the line 130. In the burner 140, the $SiO_2$ feedstock vapor is converted by pyrolysis, oxidation or hydrolysis into $SiO_2$ particles 148, also called $SiO_2$ or soot or $SiO_2$ soot.

LIST OF REFERENCE NUMERALS

100 system
105 $SiO_2$ feedstock material
107 $SiO_2$ feedstock vapor
110 storage tank/storage container
115 pre-heating device
116 inlet
117 outlet
120 vaporizer/vaporizer system
122 liquid pump
123 flow meter
124 MFC (mass flow controller)
125 expansion chamber/vaporization chamber 126 line
127 flow distributor
128 atomizing nozzle
130 line
140 burner/flame hydrolysis burner
141 burner block
142 movement of 140
143 burner flame
145 feed line
148 $SiO_2$ soot
150 media line
151 storage container
152 diluent
160 deposition surface/carrier tube
161 longitudinal axis of 160
200 soot body

The invention claimed is:

1. A method for producing synthetic quartz glass, said method comprising:
   (A) providing a liquid $SiO_2$ feedstock material, which comprises more than 70% by wt. of octamethylcyclotetrasiloxane (D4) and an additional component hexamethylcyclotrisiloxane (D3) and/or an additional component decamethylcyclopentasiloxane (D5), whereby the sum of the weight fractions of D3 and D5 is in the range between 0.5% by wt. and 3% by wt. of a total weight of the liquid $SiO_2$ feedstock material,
   (B) vaporizing the liquid $SiO_2$ feedstock material into a gaseous $SiO_2$ feedstock vapor,
   (C) converting the gaseous $SiO_2$ feedstock vapor into $SiO_2$ particles,
   (D) depositing the $SiO_2$ particles on a deposition surface so as to form $SiO_2$ soot body with an outer diameter of more than 300 mm, and
   (E) vitrifying the $SiO_2$ soot body so as to form the synthetic quartz glass, wherein said vaporizing of the liquid $SiO_2$ feedstock material comprises:
      heating the $SiO_2$ feedstock material, and
      an injection phase during which said heated $SiO_2$ feedstock material is injected into an expansion chamber in which the heated $SiO_2$ feedstock material is atomized into droplets, the droplets having a mean diameter of less than 5 μm, said heated SiO2 feedstock material being introduced into the expansion chamber so that at least a first part of the heated $SiO_2$ feedstock material vaporizes due to a pressure drop in a range between 1.8 and 5 bar.

2. The method according to claim 1, wherein the liquid $SiO_2$ feedstock material comprises more than 95% by wt. of D4.

3. The method according to claim 1, wherein vaporizing further comprises mixing the heated $SiO_2$ feedstock material with a heated diluent, so that at least a second part of the heated $SiO_2$ feedstock material vaporizes due to a decrease in the dew point.

4. The method according to claim 3, wherein the heated $SiO_2$ feedstock material is converted due to the reduction of the partial pressure at at least 99.995% by wt. into the gaseous $SiO_2$ feedstock vapor.

5. The method according to claim 3, wherein the heated $SiO_2$ feedstock material is converted due to the reduction of the partial pressure at at least 99.9995% by wt. into the gaseous $SiO_2$ feedstock vapor.

6. The method according to claim 1, wherein the heated $SiO_2$ feedstock material is converted due to the pressure drop at at least 99.995% by wt. into the gaseous $SiO_2$ feedstock vapor.

7. The method according co claim 1; and further comprising producing an optical fiber from said synthetic quartz glass.

8. The method according to claim 1, wherein the mean diameter of the droplets is less than 2 μm.

9. The method according to claim 1, wherein the liquid $SiO_2$ feedstock material comprises more than 99.5% by wt., of D4.

10. The method according to claim 1, wherein the heated $SiO_2$ feedstock material is converted due to the pressure drop at at least 99.995% by wt. into the gaseous $SiO_2$ feedstock vapor.

* * * * *